(12) United States Patent
Crawford, Sr.

(10) Patent No.: US 8,371,625 B2
(45) Date of Patent: Feb. 12, 2013

(54) REVOLUTION DADDY ROCK SUPER TRACK

(75) Inventor: Isaiah Crawford, Sr., Rock Island, IL (US)

(73) Assignee: Isaiah Crawford, Sr., Rock Island, IL (US)

( * ) Notice: Subject to any disclaimer, the term of this patent is extended or adjusted under 35 U.S.C. 154(b) by 39 days.

(21) Appl. No.: 12/923,938

(22) Filed: Oct. 15, 2010

(65) Prior Publication Data
US 2012/0091733 A1    Apr. 19, 2012

(51) Int. Cl.
*B60B 39/00* (2006.01)

(52) U.S. Cl. .................................. 291/2; 291/3

(58) Field of Classification Search ............. 291/2, 3, 291/11.1, 11.2, 11.3, 12
See application file for complete search history.

(56) References Cited

U.S. PATENT DOCUMENTS

| | | | |
|---|---|---|---|
| 1,516,211 A * | 11/1924 | Saunders | 291/11.1 |
| 1,575,098 A * | 3/1926 | Conty | 291/28 |
| 1,755,823 A * | 4/1930 | Hopkins | 291/1 |
| 1,832,581 A * | 11/1931 | Riley | 291/3 |
| 1,850,795 A * | 3/1932 | Hoffmann | 291/3 |
| 2,207,169 A * | 7/1940 | Todd | 291/3 |
| 3,140,110 A * | 7/1964 | Wonner | 291/2 |
| 3,606,420 A * | 9/1971 | Hultstrom et al. | 291/3 |
| 3,797,867 A * | 3/1974 | Hartl | 291/3 |
| 4,968,069 A * | 11/1990 | Jensen | 291/3 |
| 5,010,982 A * | 4/1991 | Sedlmayr | 188/4 B |
| 5,582,441 A * | 12/1996 | Frost | 291/2 |
| 6,371,532 B1 * | 4/2002 | Skarie et al. | 291/38 |
| 7,370,888 B2 * | 5/2008 | Byrne | 280/851 |
| 7,575,258 B1 * | 8/2009 | Osei-Bosompem | 291/2 |
| 2003/0020282 A1 * | 1/2003 | Biddings | 291/2 |
| 2012/0091733 A1 * | 4/2012 | Crawford, Sr. | 291/25 |

\* cited by examiner

*Primary Examiner* — Jason C Smith (57) ABSTRACT

The Revolution Daddy Rock Super Track is a salt sifting tank that dispenses rock salt directly to the front of the vehicle wheels followed by the rear wheels which would prevent the automobile from sliding side to side and also aiding the vehicle to go up and down hills in the winter time with super traction.

1 Claim, 12 Drawing Sheets

REVOLUTION DADDY ROCK SUPER TRACK

BACKGROUND OF THE INVENTION

The field of this invention is to prevent automobiles from sliding on ice and snow. My invention would enable a vehicle to drive up any hill or drive down any hill during the winter months on ice/snow with super traction without losing control of the vehicle. There are no known patterns of my invention which came up in my research that was comparable to my invention of Revolution Daddy Rock Super Tract.

BRIEF SUMMARY OF THE INVENTION

The nature of this invention is to prevent motor vehicle accidents in the winter time and save lives.

This invention will prevent motor vehicles from sliding out of control off of roads and colliding with each other. This invention is not intended for high speed driving during the winter months, but its intention is to keep the motor vehicle on the road under weather advisory traveling conditions.

The advantage of having "Revolution Daddy Super Track" on your vehicle is being able to drive on snow and ice in areas where the roads would not have been salted down by City Salt trucks. The invention would allow your vehicle not to get stuck in the snow and ice.

This invention would enable you to go up and down hills during the winter time without spinning and sliding out of control. It would enable you to keep your car straight on the roadway by controlling the tractions of the wheels.

DETAILED DESCRIPTION OF THE INVENTION

Figure 1:
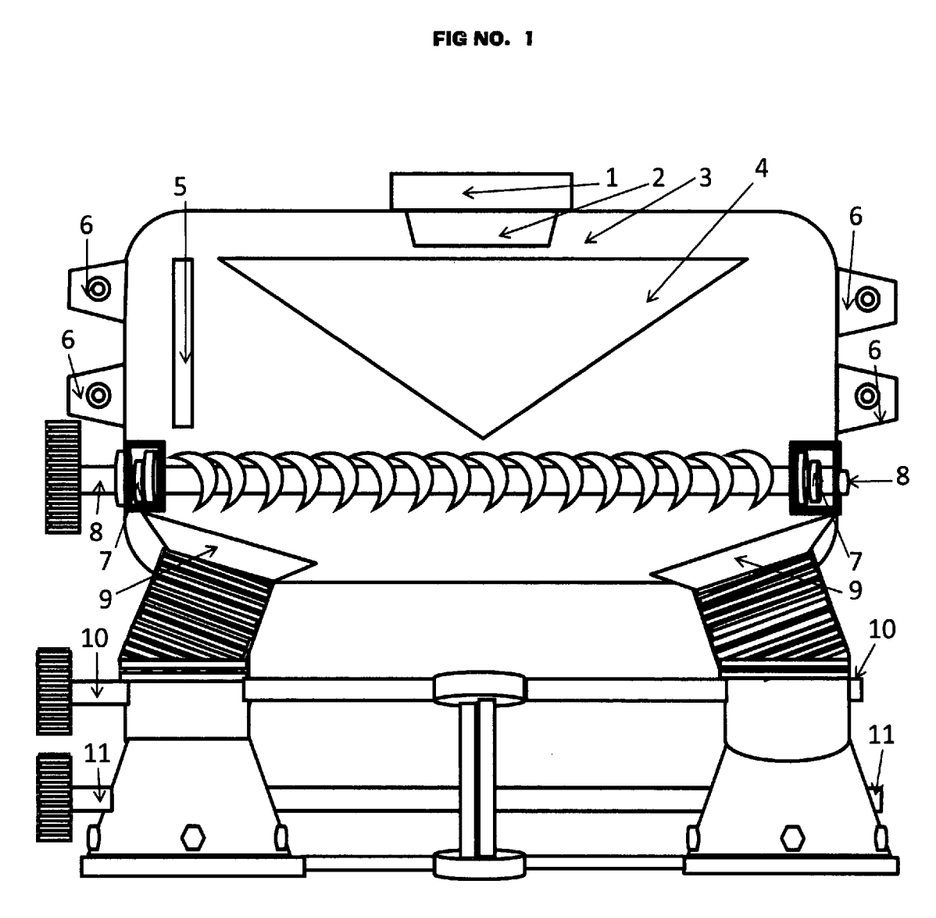
FIG. 1: Shows drawing #1 through #11 of the Revolution Daddy Rock Super Track entire invention of front view.
Figure 2:
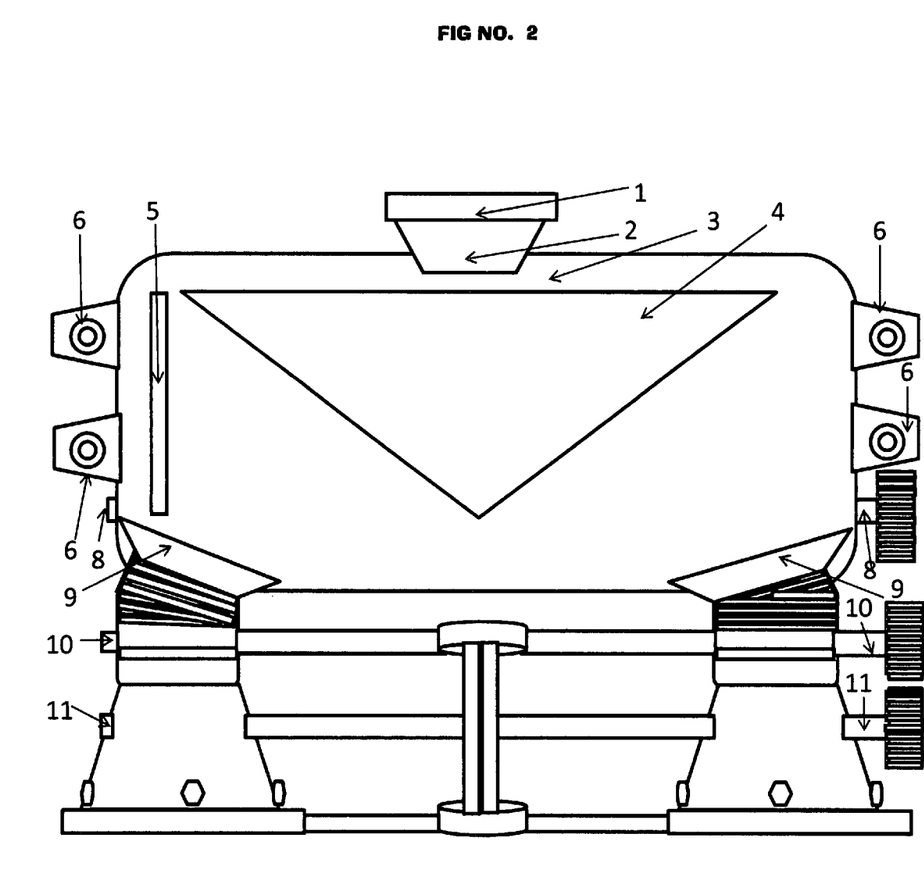
FIG. 2: Shows drawing #1 through #11 of back view of the Daddy Rock Super Track entire invention (FIG. 2 I made some adjustments to the #10 and #11 to make it look appropriate like #1.).
Figure 3:
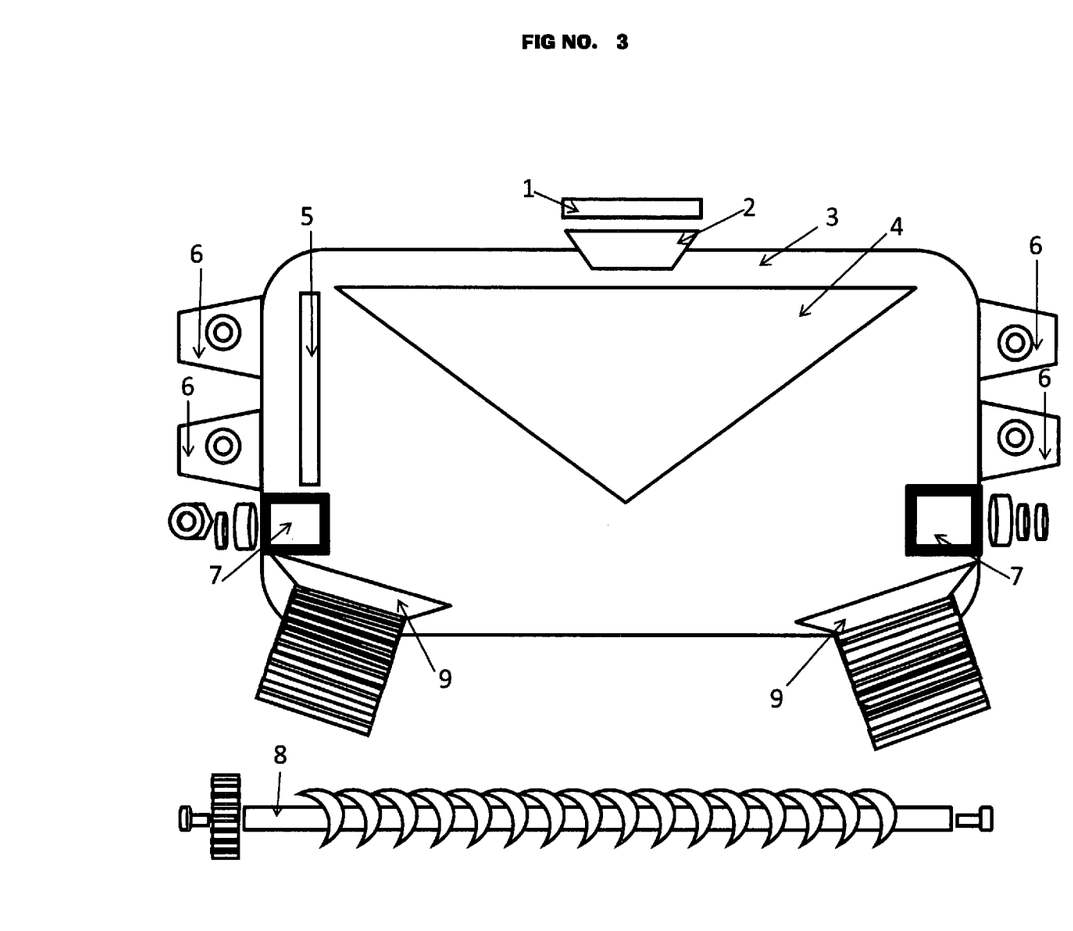
FIG. 3: Showing the first layout of invention of number parts 1 through 9.
Figure 4:
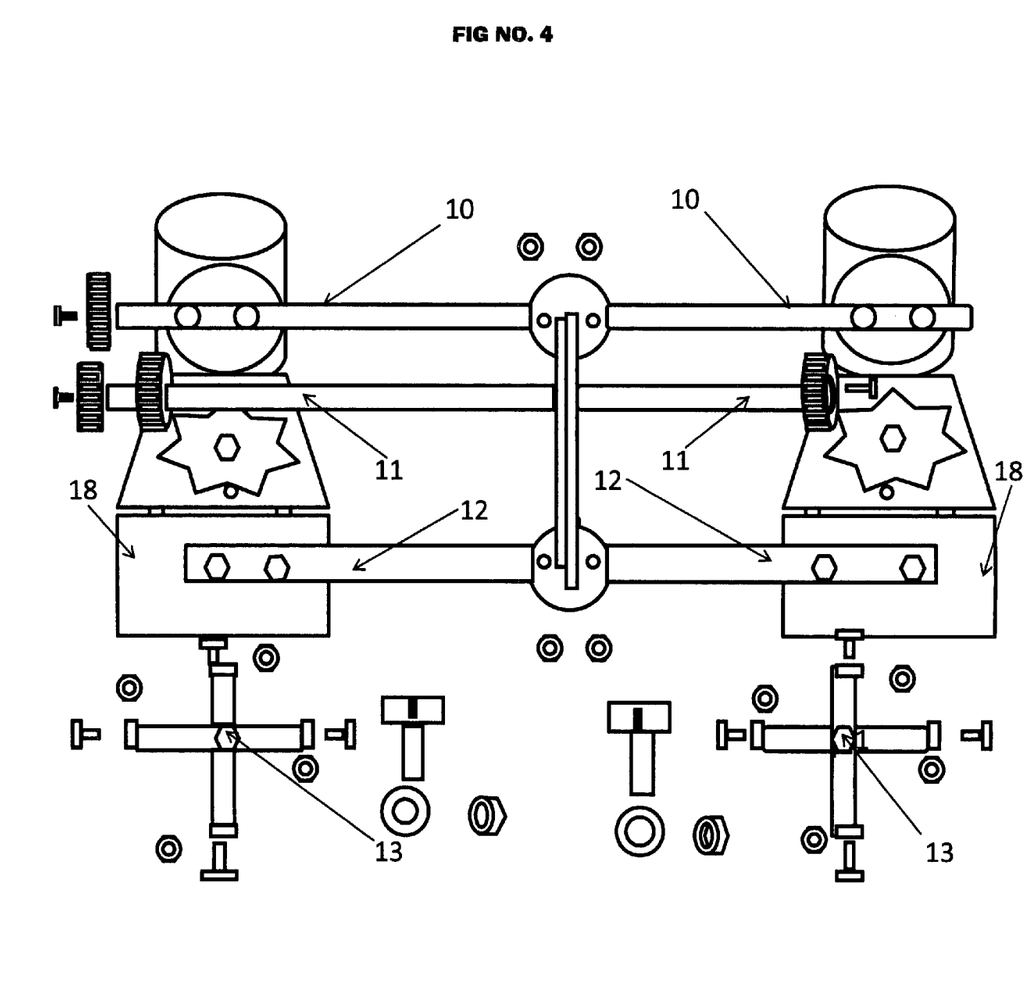
FIG. 4: Showing the second layout of invention of number parts 10, 11, 12, 13, and 18.
Figure 5:
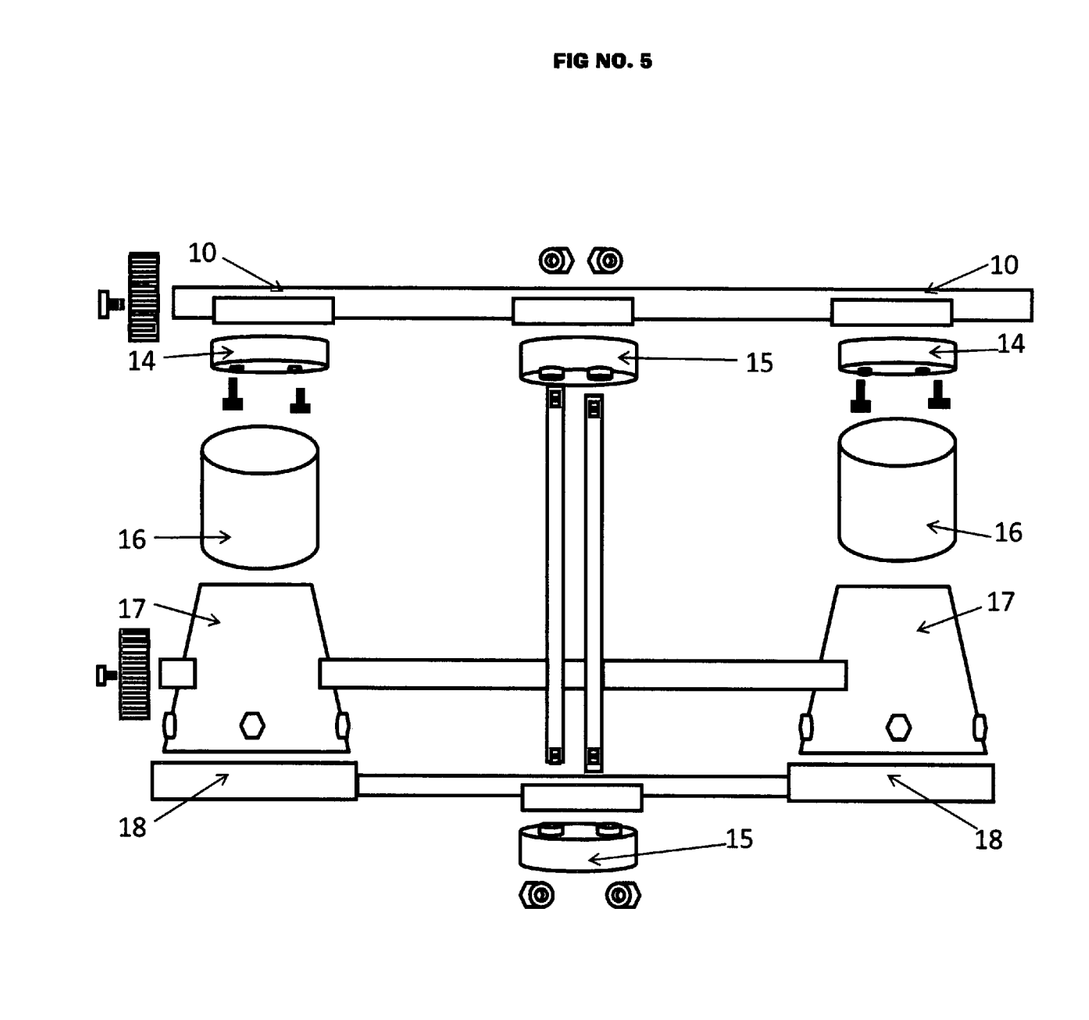
FIG. 5: Showing the third layout of invention of number parts, 10, 14, 15, 16, 17 and 18.
Figure 6:
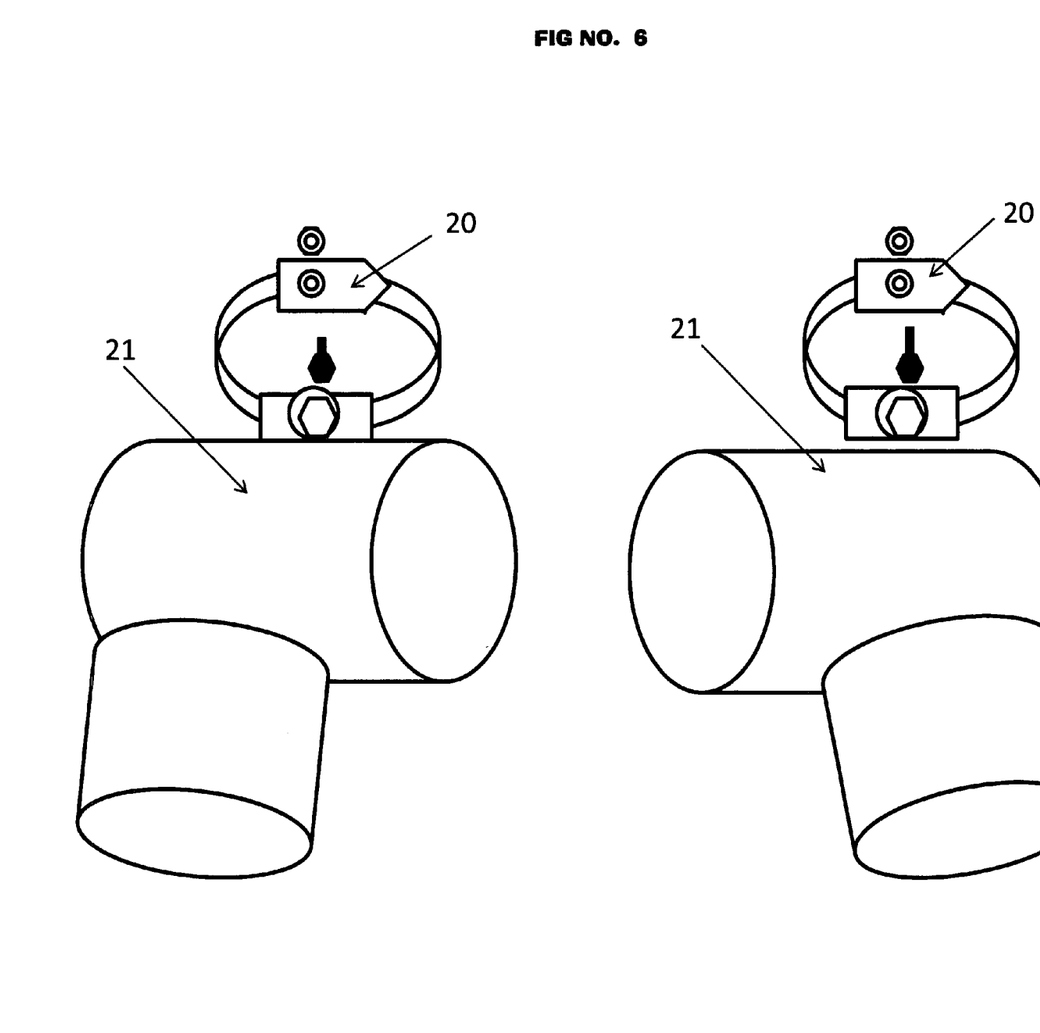
FIG. 6: Showing the four layout of invention of number parts 20 and 21.
Figure 7:
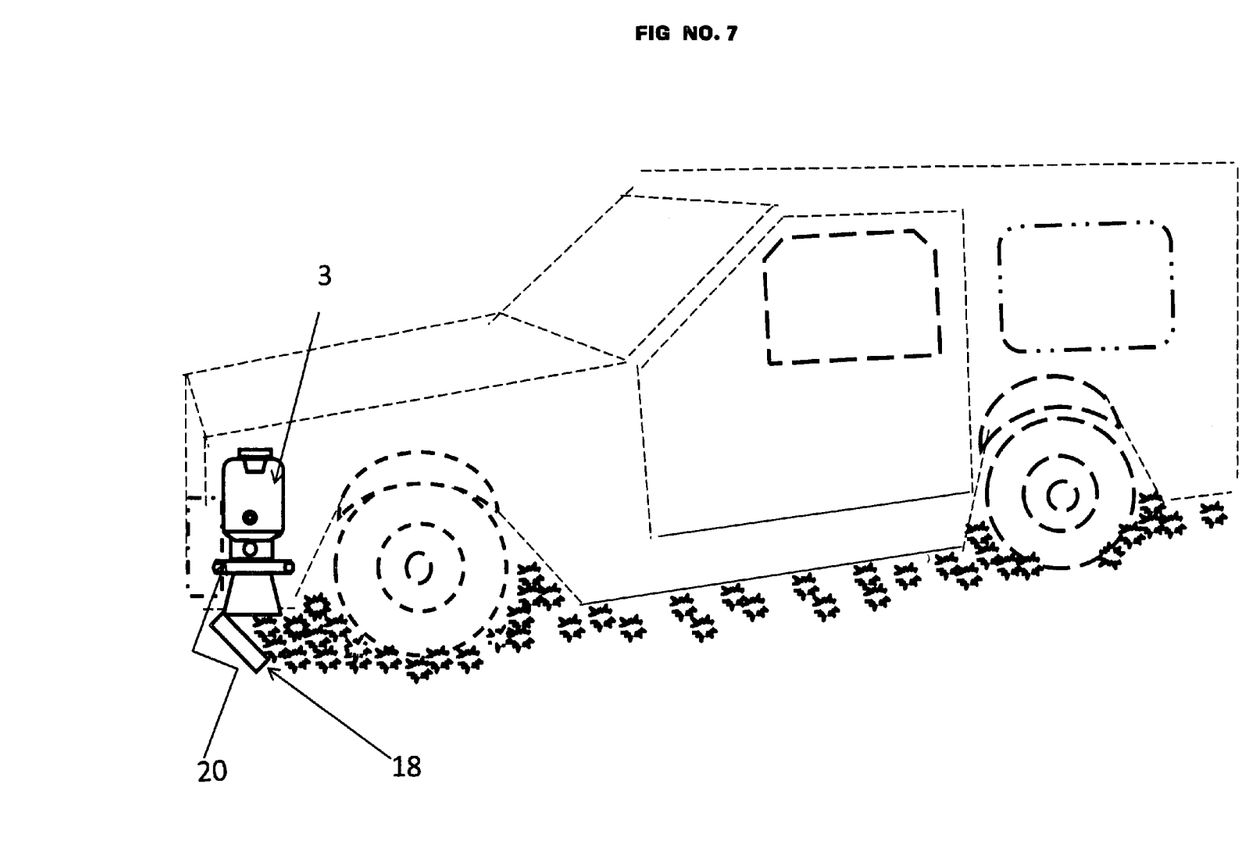
FIG. 7: Shows how the Revolution Daddy Rock Super Tract is installed in the vehicle on the front, see #3, and #20 is the bumper strap. Number 18 shows how the salt disperses directly to the wheels of the vehicle.
Figure 8:
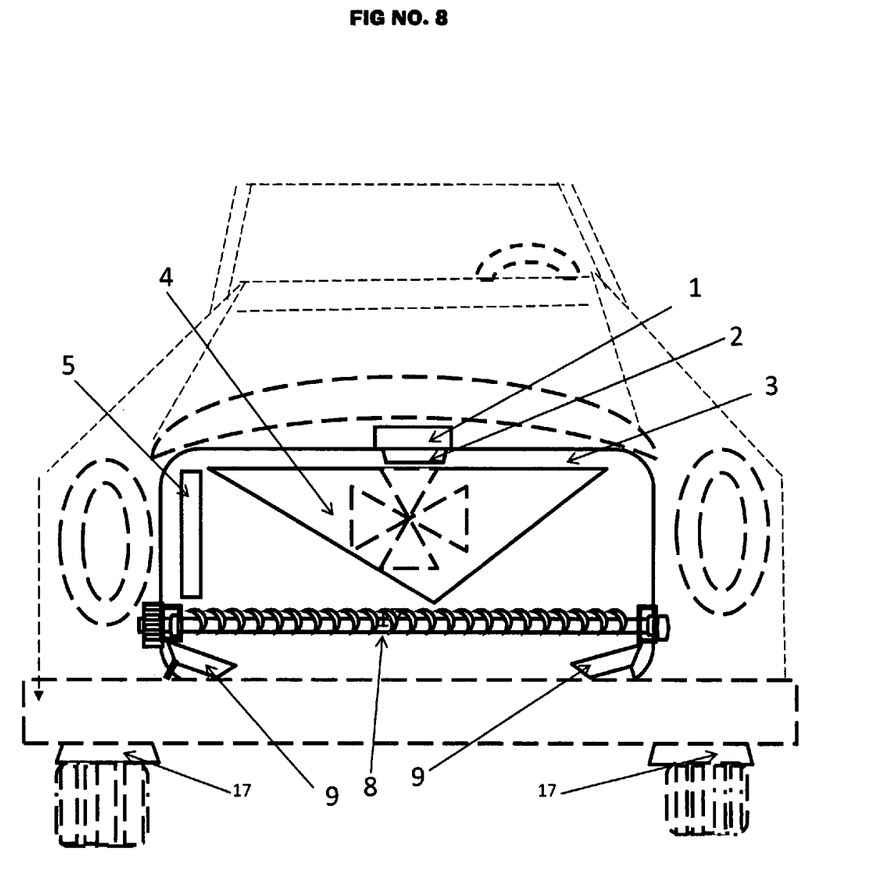
FIG. 8: Shows Numbers 1, 3, 4, 5, 8, 9 and 17 the front view of the Revolution Daddy Rock Super Track on how it is installed on the vehicle.
Figure 9:
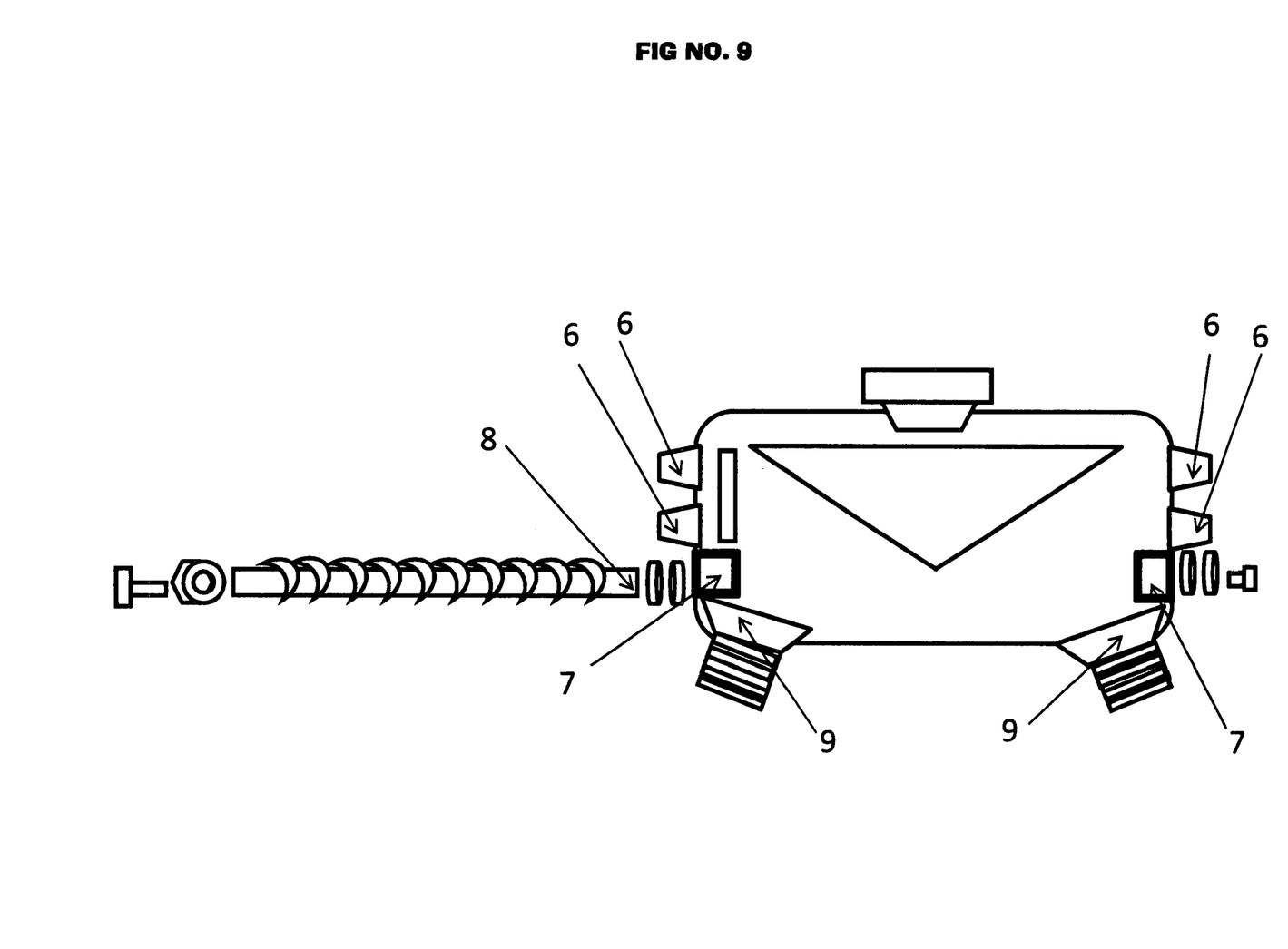
FIG. 9: Shows another view of various parts and how they are installed number parts 6, 7, 8, and 9.
Figure 10:
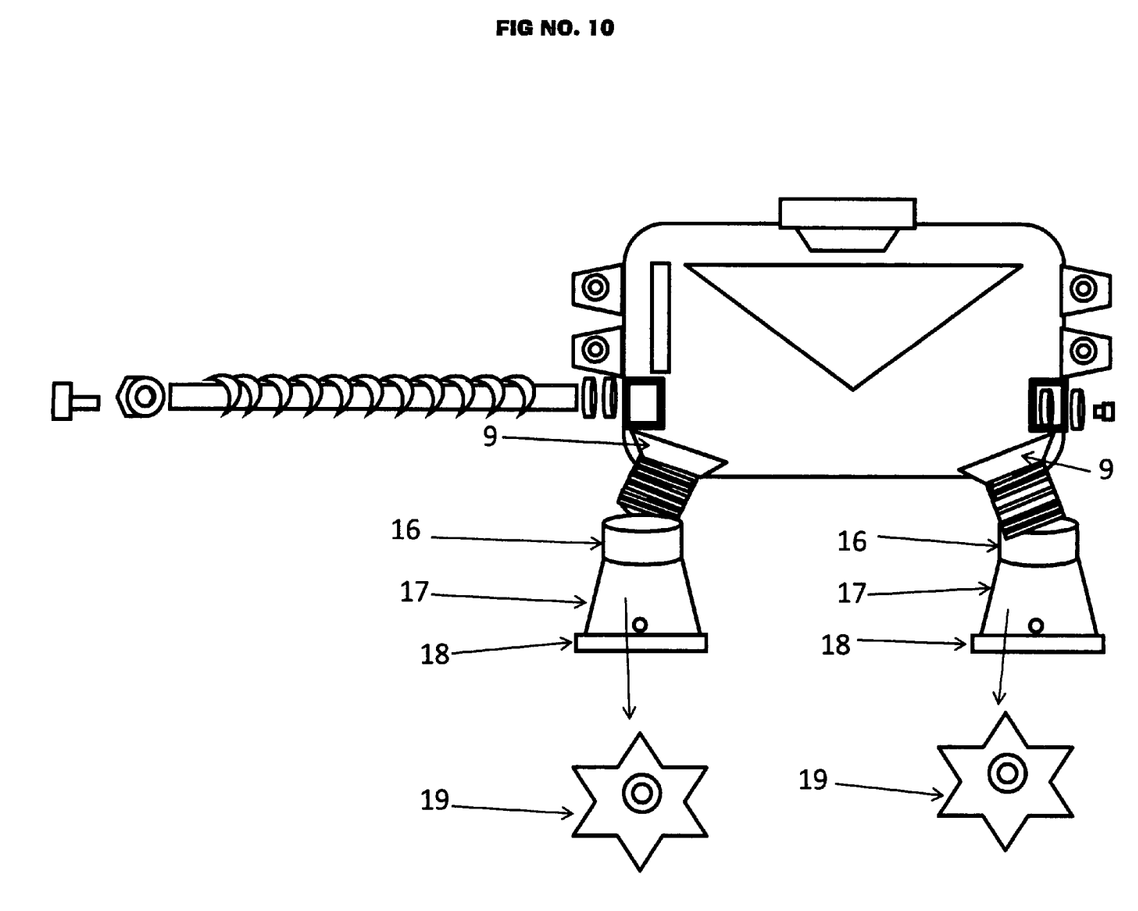
FIG. 10: Shows how number parts 9, 16, 17, 18 and 19 shows how parts connect.
Figure 11:
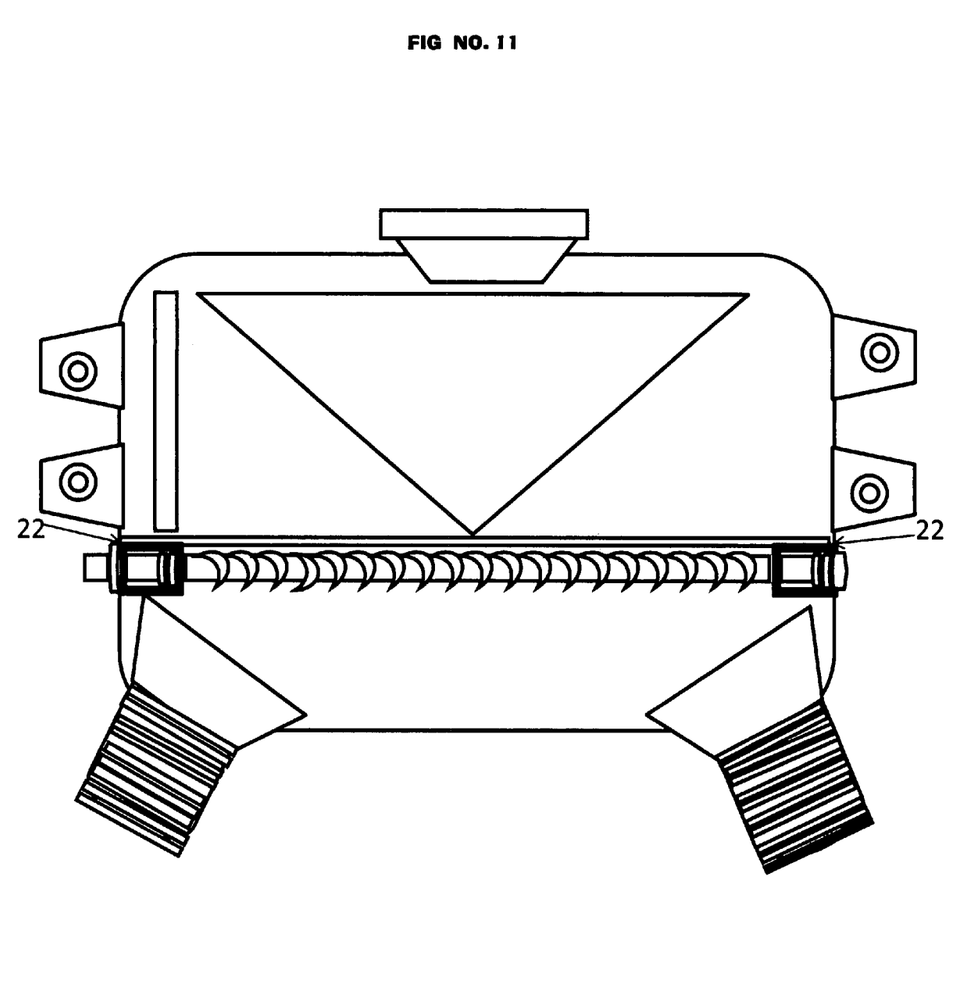
FIG. 11: Number 22 shows where the Revolution Daddy Rock Super Track invention separates.
Figure 12:
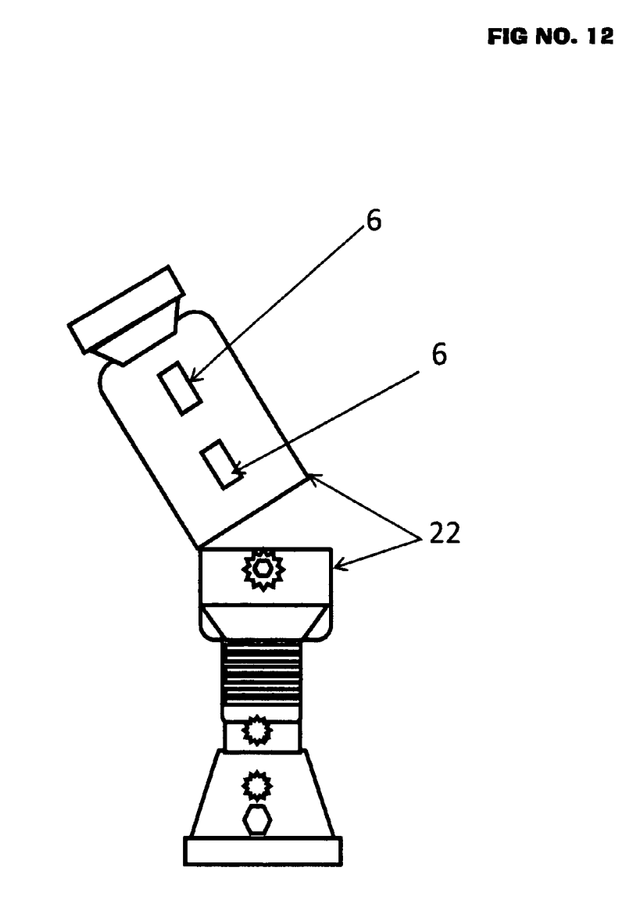
FIG. 12: Shows part number 6 is the holders that bolts to the vehicle and the overall view shows the separation for cleaning and maintenance, see #22, of the Revolution Daddy Rock Super Track invention.

FIG. 1 shows the front view of the invention. Number 1 is the cap. Number 2 is the spout where the salt is poured in. Number 3 is the tank. Number 4 is the opening for the radiator fan. Number 5 is the sight glass. Number 6 is the bolt holder for fastening to the vehicle. Number 7 is seal and the barrens. Number 8 is the blade and the gear. Number 9 is the flex pipe. Number 10 is the butterfly gear and cam rod. Number 11 is the lower gear and cam rod. FIG. 2 shows the back view of the invention numbers 1 through 11. FIG. 3 shows part number 1 is the cap that covers the spout on part number 2 which is the spout that you pour the rock salt into. Part 3 number is the tank of the Daddy Rock Super Track. Part number 4 is the opening where the fan is allowed to circulate the air to the engine. Part number 5 is the site glass which will show the level of the salt in the tank. Part number 6 is the holder tabs that enables the Daddy Rock Super Track to be fastened to the vehicle. Part number 7 is the opening where you install, part number 8 which is the blade. The blade goes in first and then the seal, then the barrens in front of part number 7 on the left and the right. In front of part number 8 is the gear and the gear bolt and on the right side of number 8 is the hold down bolt for the right side of the blade. Part number 9 is the flex pipe that comes out of the bottom of the tank. FIG. 4 shows part number 10 is the butterfly upper cam rod which connects to the butterfly and gear. Part number 11 is the sifting rod and gears (left, right and outside gear to the left). The gear to the left and the right is the drive gear for the sifting wheel. The gear to the outside left of part number 11, is the drive gear. Part number 12 is the lower cam rod that opens the doors to part number 18 which is bolted to 18. Part number 13 is sifting wheel hold down bracket with nuts and bolts. The two bigger bolts in the center is the sifting gear hold down bolt with lock, washer, and nuts. FIG. 5 shows part number 10 is the cam rod and part number 14 is the butterfly and butterfly bolts that connect to the cam rod. The butterfly and cam rod fits into part number 16. Part number 16 fits into part number 17. Part number 18 is attached to part number 17, part number 18 is the door connected to the lower cam rod. Part number 15 is the upper and lower cam and the push rods in the middle and the push rod hold down bolts at the top and the bottom of the cam and cam rod. FIG. 6: Part number 20 is the hold down strap for the Daddy Rock Super Tract bumper attachment to the sifting housing. Part number 21 is the after market adapter to be able to adapt the Daddy Rock Super Track to the front of the vehicle outside on the bumper or to insert the Daddy Rock Super Track between the motor and the radiator and allow to be flexed out to the inside of the bumper in front of the front wheels. FIG. 7 shows part #3 the Daddy Rock Super Track and part #20 bumper strap to the bumper with part number 18, housing door open and the salt being sifted to the wheels which is leading to the rear wheels. FIG. 8 shows the Daddy Rock Super track with part #1 cap, part #2 sprout, part #3 Daddy Rock Super Track body, part #4 is opening for the cooling fan, showing the triangle opening that allows the fan motor to breath outside of the front of the vehicle. Part #5 is the site glass, part #8 is the salt blade, part #9 is the flex pipes and part #17 is the sifting housing. FIG. 9 shows a more clear picture of how part number 8, the rotating salt blade fits into part number 7, the blade housing and part #9 is the flex pipe. FIG. 10 shows part 9, flex pipe connecting to part number 16, which is the butterfly pipe that allows the butterfly to open and close to either hold the salt in the tank and release it out of the tank to the sifting wheel. Part number 18 is the sifting housing door that allows the salt to be sifted directly to the front wheel followed by the rear wheel. Part number 19 is the sifting wheel that is placed in part number 17 sifting housing that allows the salt to be sifted to the ground. FIG. 11 shows part #22 with arrows to the left and the right of the tank showing where the tank separates for maintenance and repair. FIG. 12 shows wider view of the Daddy Rock Super Track tank separates for cleaning and maintenance. Part #6 is the bolt holder for attachment to the vehicle and part #22 with the double arrows shows how it separates. The Daddy Rock Super Track will be powered by individual DC motors that will be attached to the outer gears on the Daddy Rock Super Track.

The invention claimed is:

1. A vehicle salt dispensing system to be installed in the front end of a vehicle behind said vehicle grille or by installing an aftermarket adapter to be able to fit the vehicle salt dispensing system to the front of the vehicle on the outside of a vehicle bumper, comprising:
  a cap covering a spout,
  said spout is where salt is poured into,
  a tank connected to the spout for holding the salt, sight glass provides visible levels of said salt in the tank, and
  an opening for a radiator fan which circulates air to an engine,
  wherein the device further comprises bolt holders which fasten the vehicle salt dispensing device to a vehicle, the vehicle salt dispensing system also comprises:
  a rotating salt blade which fits into a blade housing,
  two flex pipes which are connected to the bottom of said tank,
  an upper cam rod, a lower cam rod, and also a sifting rod which are connected to butterflies, a plurality of gears are also connected to the upper cam rod and to the sifting rod, the plurality of gears including a drive gear which is connected to the sifting rod,
  a set of doors which are connected to the lower cam rod, the lower cam rod opens the set of doors to allow salt to dispense from the system, the system further comprising:
  a butterfly pipe connected to the flex pipes that allow the butterflies to open and close,
  the sifting wheels allow the salt to sifted directly to a set of front wheels of said vehicle followed by sifting to a set of rear wheels of said vehicle,
  said salt dispensing apparatus is powered by individual DC motors that are attached to the gears on the device,
  said upper cam rod and lower cam rod with push rods allow said butterflies to open and close on each side of the device to contain said salt in the salt tank or release it out of said salt tank on each side of the device to be dispensed to said wheels through housing doors and allow the salt to be sifted directly to each said front wheels through each of said flex pipes by the rotation of said salt blade in said salt tank by attaching said DC motors to a blade gear, an upper cam gear, and to a sifting main gear which are attached to secondary gears of said sifting main gear, in which the secondary gears are connected to said sifting wheels to dispense the salt to the wheels of the vehicle.

* * * * *